United States Patent
Muttik et al.

(10) Patent No.: US 10,097,951 B2
(45) Date of Patent: Oct. 9, 2018

(54) PROVABLE GEO-LOCATION

(71) Applicant: MCAFEE, LLC, Santa Clara, CA (US)

(72) Inventors: Igor Muttik, Berkhamsted (GB); Simon Crowe, Buckinghamshire (GB); Joel Silber, Milton Keynes (GB); Stephen Pearce, Aylesbury (GB); Stephen Hearnden, Santa Clara, CA (US)

(73) Assignee: McAfee, LLC, Santa Clara, CA (US)

( * ) Notice: Subject to any disclaimer, the term of this patent is extended or adjusted under 35 U.S.C. 154(b) by 40 days.

(21) Appl. No.: 14/230,269

(22) Filed: Mar. 31, 2014

(65) Prior Publication Data

US 2015/0281888 A1    Oct. 1, 2015

(51) Int. Cl.
*H04W 4/021*    (2018.01)
*H04W 12/10*    (2009.01)
*H04W 12/06*    (2009.01)
*H04L 29/06*    (2006.01)
*H04W 12/12*    (2009.01)

(52) U.S. Cl.
CPC ............. *H04W 4/021* (2013.01); *H04L 63/08* (2013.01); *H04W 12/06* (2013.01); *H04W 12/10* (2013.01); *H04W 12/12* (2013.01)

(58) Field of Classification Search
CPC ................................ H04W 4/02; H04W 12/06
USPC .................................................. 455/411, 412
See application file for complete search history.

(56) References Cited

U.S. PATENT DOCUMENTS

| | | | |
|---|---|---|---|
| 7,136,747 B2 * | 11/2006 | Raney | 701/465 |
| 8,180,326 B2 * | 5/2012 | Hahn | H04W 8/16 455/410 |
| 8,217,771 B2 * | 7/2012 | Chen et al. | 340/425.5 |
| 8,531,334 B2 | 9/2013 | Wolman et al. | |
| 9,083,527 B1 * | 7/2015 | McCorkendale | H04L 9/28 |
| 9,224,000 B1 * | 12/2015 | Ghetti | H04L 9/083 |
| 2007/0098210 A1 | 5/2007 | Pan et al. | |
| 2010/0205316 A1 | 8/2010 | Wen et al. | |
| 2011/0009092 A1 * | 1/2011 | Etchegoyen | 455/411 |

(Continued)

FOREIGN PATENT DOCUMENTS

| JP | 2007-006131 | 1/2007 |
|---|---|---|
| JP | 2007006131 A | 1/2007 |

(Continued)

OTHER PUBLICATIONS

International Search Report and Written Opinion regarding corresponding PCT Application No. PCT/US2015/022066, dated May 29, 2015.

(Continued)

*Primary Examiner* — Anthony Addy
*Assistant Examiner* — Donald H. B. Braswell
(74) *Attorney, Agent, or Firm* — Hanley, Flight & Zimmerman, LLC (57) ABSTRACT

A geo-location provider station signs geo-location data and a previous signature provided by a mobile device, returning a new signature to the mobile device. The mobile device uses the new signature when requesting a signature from another geo-location provider station. The mobile device stores the geo-location data and the signatures provided by geo-location provider stations. The stored geo-location data may be verified upon request by using the stored signature data.

14 Claims, 7 Drawing Sheets

(56) References Cited

U.S. PATENT DOCUMENTS

| | | | |
|---|---|---|---|
| 2011/0130114 A1* | 6/2011 | Boudville | 455/404.2 |
| 2012/0190380 A1 | 7/2012 | Dupray et al. | |
| 2013/0106655 A1 | 5/2013 | Pujante Cuadrupani | |
| 2013/0159186 A1 | 6/2013 | Brudnicki et al. | |
| 2013/0251150 A1* | 9/2013 | Chassagne | G01S 1/042 |
| | | | 380/270 |
| 2014/0006785 A1* | 1/2014 | Shaliv | H04L 9/088 |
| | | | 713/170 |

FOREIGN PATENT DOCUMENTS

| | | |
|---|---|---|
| JP | 2007-195068 | 8/2007 |
| JP | 2007195068 A | 8/2007 |
| WO | 2008010287 | 1/2008 |
| WO | 2008010287 A1 | 1/2008 |

OTHER PUBLICATIONS

Hasan, R., et al., (2011), "Where Have You Been? Secure Location Provenance for Mobile Devices", URL:http://arxiv.org/abs/1107.1821, 14 pages.

Saroiu, S., et al., (2009), "Enabling New Mobile Applications with Location Proofs", Mobile Computing Systems and Applications, pp. 1-6.

European Search Report, dated Oct. 18, 2017, 9 pages.

Japanese Patent Office, "Notification of Reasons for Refusal," issued in connection with Japanese Patent Application No. 2016-552501, dated May 21, 2018, 16 pages.

Haber et al., "How to Time-Stamp a Digital Document," Journal of Cryptology, vol. 3, No. 2, 1991, 13 pages.

* cited by examiner

PROVABLE GEO-LOCATION

TECHNICAL FIELD

Embodiments described herein generally relate to geo-location, and in particular to a technique for using chained signing to provide verification of geo-location data.

BACKGROUND ART

Geo-location refers to identifying a geographic location of an object, such as a mobile device. Geo-location services are available on most contemporary mobile devices like smartphones, tablets and ultra-books. These services are provided to local apps or remote software and geo-location improves user experience. Geo-location can also be used to enhance security. For example, sensitive bank transactions may be restricted and allowed only if the device is located where it should be. Geo-location data is created via many methods (and combinations of them): satellite-based systems, mobile triangulation, Wi-Fi access point location, proximity to other devices (e.g. established via Bluetooth or NFC) for which the location is known, accelerometer, etc. Satellite-based systems include the U.S. Global Positioning Satellite (GPS) system and the Russian Global Navigation Satellite System, (GLONASS); other satellite-based systems are under constructions, including the European Union's Galileo system, the Indian Regional Navigational Satellite System (IRNSS), and the Chinese Bei-Dou 2 or Compass system. Although often thought of as providing two-dimensional (x, y) coordinates, geo-location data may and often does include three-dimensional (x, y, z) coordinates, and are generally time-stamped.

Unfortunately, known geo-location methods do not give guarantees about the location data accuracy. These methods often rely on external services: satellite transmissions, mobile telephone system towers, wireless networking (Wi-Fi) access points, or other external devices. There is always a possibility of an error or deliberate manipulation of an external service resulting in incorrect geo-location data. For example, a man-in-the-middle attack when connecting to an access point without using pre-shared certificates via protected extensible authentication protocol, PEAP may provide erroneous geo-location data. Even a genuine location data may be corrupted after the data is received and stored in a mobile device. Such corruption can be performed by malware or even by the device owner.

Incorrect geo-location may then be used in sensitive computations which use the device's position. Examples of such sensitive computations may include:

1) A verification step in a sensitive financial transaction
2) Making an emergency call or sending a SOS/distress signal
3) Locating a stolen device
4) When one has to follow a court order (e.g., an order to stay farther than 50 m from another person)

Overall, the problem of general unreliability of geo-location is seriously limiting its uses when maximum trust in the location data is required. There is no proper solution available.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer or a plurality of computers working together to perform the function described as being performed on or by a computer system. Similarly, a machine-readable medium can refer to a single physical medium or a plurality of media that may together contain the indicated information stored thereon. A processor can refer to a single processing element or a plurality of processing elements, implemented either on a single chip or on multiple processing chips.

Figure 1:
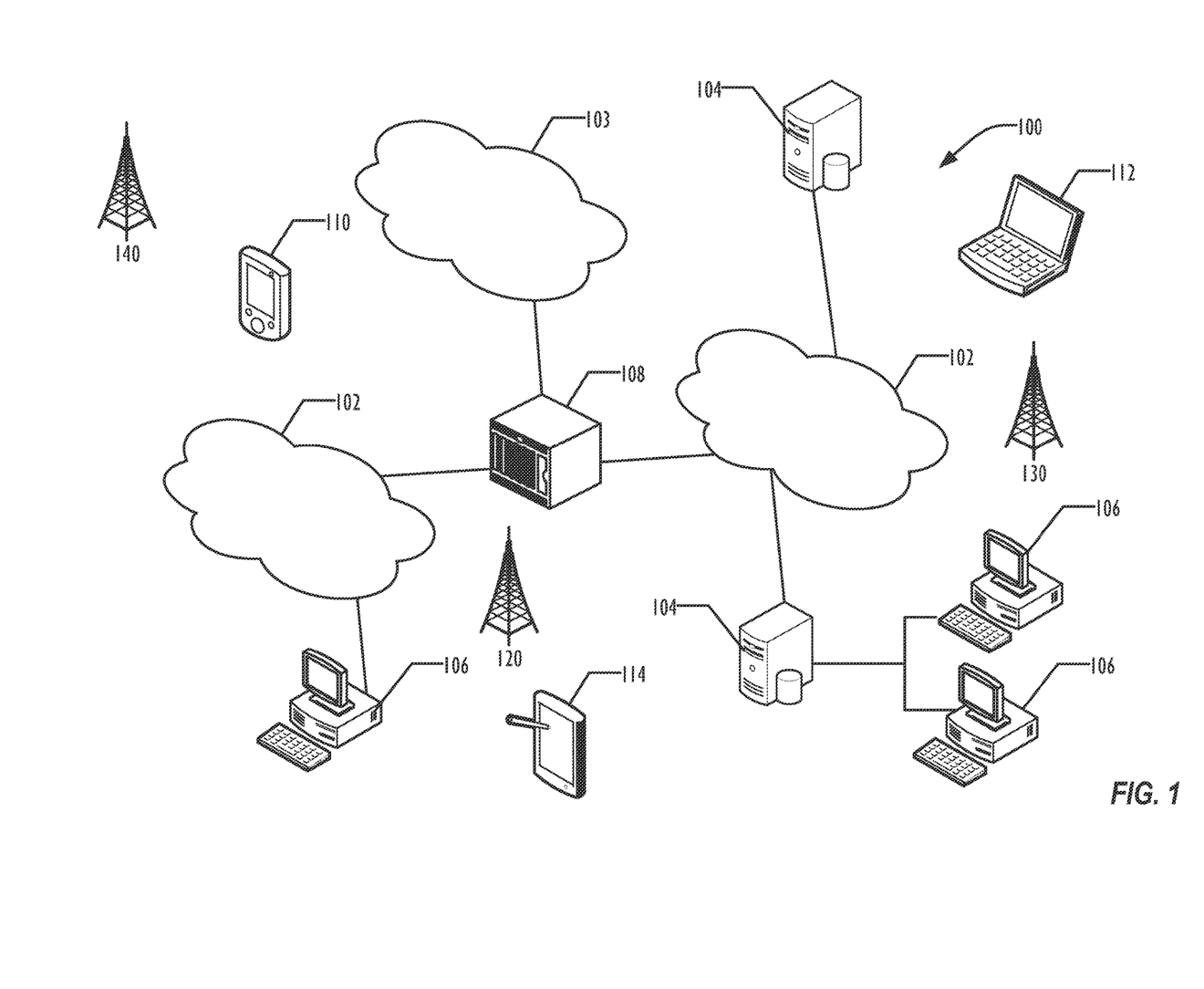
FIG. 1 is a block diagram illustrating an infrastructure in which provable geo-locations services may be implemented according to one embodiment.

Referring now to FIG. 1, an example infrastructure 100 in which the techniques described below may be implemented is illustrated schematically. Infrastructure 100 contains computer networks 102. Computer networks 102 may include many different types of computer networks available today, such as the Internet, a corporate network, or a Local Area Network (LAN). Each of these networks can contain wired or wireless programmable devices and operate using any number of network protocols (e.g., TCP/IP). Networks 102 may be connected to gateways and routers (represented by 108), end user computers 106, and computer servers 104. Infrastructure 100 also includes cellular network 103 for use with mobile communication devices. Mobile cellular networks support mobile phones and many other types of devices. Mobile devices in the infrastructure 100 are illustrated as mobile phones 110, laptops 112, and tablets 114. A mobile device such as mobile phone 110 may interact with one or more mobile provider networks as the mobile device moves, typically interacting with a plurality of mobile network towers 120, 130, and 140 for connecting to the cellular network 103. The mobile network towers 120, 130, and 140 may calculate and provide geo-location data to the mobile devices 110, 112, and 114. Although referred to as a cellular network in FIG. 1, a mobile device may interact with towers of more than one provider network, as well as with multiple non-cellular devices such as wireless access points and routers 108. A mobile device may also obtain geo-location data from a geo-location satellite (not shown). In addition, the mobile devices 110, 112, and 114 may interact with non-mobile devices such as computers 104 and 106 for desired services, which may include providing verifiable geo-location data to those non-mobile devices. In the following discussion, mobile device 110 is used as representative of all mobile devices.

The following discloses a system which uses chained signing of the geo-location data. Every time when a mobile device 110 connects to an external third party provider (3G, Wi-Fi, etc.) the mobile device 110 will provide history (the chain) of previous locations for "stamping" (cryptographic signing). As described below, the providers are termed "stations" and station 120 (in FIG. 1, a mobile network tower) is used as representative of all stations. Stations do not have to be static; they are allowed to move like, for example, Google's proposed Wi-Fi balloons. The stations each support a cryptographic signing service for "stamping" the location data. In addition, both stations and devices may employ protocols and APIs for processing the chained signed geo-location data, as described in more detail below. Various embodiments may employ a combination of cryptographic signing and encryption.

As in conventional mobile device systems, the mobile device 110 keeps a log of its geo-location, stored in any convenient or desired manner. This information is obtained from the stations and may be used for various location-based services. In some embodiments, the mobile device 110 also keeps a log of station geo-location data obtained from the stations with which it interacts. The mobile device 110 also stores a device ID data that identifies the mobile device 110.

In brief, the chained signing and verification work as follows:

1) The mobile device 110 submits its device ID, the current geo-location data, and the previous signature to the station 120 in a data structure. In some embodiments, a collection of historical geo-location data is provided in addition to the current geo-location data.

2) The station 120 receives the data structure. The station 120 then signs the data structure and returns the new signature to the mobile device 110. In some embodiments, the station 120 may update the data structure before signing to include current station geo-location data.

3) The mobile device 110 receives and stores the new signature received from the station 120 for future use, adding signature $R_i$ to the signature chain $R_1, R_2, \ldots, R_{i-1}, R_i$, which is stored for future use.

4) When the mobile device 110 records a new location, such as when the device moves or when a predefined period of time has passed since the previous signing, the mobile device 110 updates the data structure to include the current device location and the most recent signature received from a station 120, then repeats with step 1.

When a request for proving the geo-location data is received, the chain of signatures can be verified, using conventional cryptographic techniques to verify each of the chain of signatures.

In one embodiment, the data structure kept by the mobile device 110 and provided to each station is a tuple such as:

$$D_i = \{deviceID, deviceLocation, R_{i-1}\}$$

in which deviceID is an ID for the mobile device 110;

deviceLocation is the current geo-location of the mobile device 110; and $R_{i-1}$ is the most recent signature returned from a station 120.

The members of the tuple may be in any desired order, and other tuple members may be included as desired. Although described as the current device or station geo-location, the deviceLocation may be a deviceLocationHistory collection of historical geo-location data for the mobile device 110, including the current geo-location data. The deviceLocationHistory collection in some embodiments is an array, but may be any convenient data structure for storing a log of recorded geo-location data.

Each geo-location data may be given as either two-dimensional {x,y} coordinates or three-dimensional {x,y,z} coordinates, in any desired coordinate system, and preferably includes a timestamp to indicate when the geo-location data was provided to the mobile device 110. For clarity, however, the geo-location data is described below in terms of two-dimensional coordinates. The geo-location data may be represented by coordinates in plaintext or as a hash of such coordinates. One-way cryptographic hashing is often used as a reliable representation of the original data which reduces privacy concerns.

In one embodiment, the signature generated by the station and returned to the mobile device can be described as:

$$R_i = signature(D_i, stationLocation)$$

in which stationLocation is the current geo-location of the station 120.

Each signature preferably includes a timestamp. The timestamp may be self-signed or provided by a standard external trusted time service provider such as Verisign, Inc. Each station may use a different signing technique. If multiple signing techniques are supported by an embodiment, each signature may carry information about the signing technique. The signature is typically generated using public/private cryptographic technique using a private key for the station 120 based on a certificate of trust in a hierarchy of trust rooted in a root certificate authority, allowing verification of the signature with the public key for the station 120. However, other cryptographic techniques may be used to generate the signatures as desired. In some embodiments the signature may contain a cryptographic hash of the signed data which includes at least part of the geo-location history. Contemporary hashing algorithms (like SHA-2 family and SHA-3) have good cryptographic resistance against hash collisions providing uniqueness of a hash-based signature.

In some embodiments, the station 120 may also include a stationID value as part of the signature, the stationID identifying the station 120. In some embodiments, the stationLocation data is not included in the signature.

The stations 120 may use any desired cryptographic signing technique, and each station 120 may use a different signing technique. For example, a station 120 may employ a certificate assigned to that station 120 and derived from some root of trust in a standard Public Key Infrastructure (PKI) technique. The signature preferably includes a timestamp, either self-signed or provided via a standard external trusted time service like Verisign, which provides timestamps with a higher level of trust than timestamps that were provided by the mobile device 110 or station 120. In some embodiments, the station 120 may also include a stationID value as part of the signature, the stationID identifying the station 120.

Not all stations 120 are required to sign the data structure $D_i$, and in such situations, the mobile device 110 may place a special value, such as zero, in the signature chain, to indicate that the data structure $D_i$ was not signed in that iteration. For example, a mobile device 110 may interact with some stations 120 that are incapable of signing or processing the data structure $D_i$, some stations 120 that are capable of signing the data structure $D_i$, but refuse to sign, and some stations 120 that sign according to the techniques disclosed herein. The mobile device 110 may continue to update the deviceLocationHistory data collection, as well as the signature chain with device and station geo-location data, even though those unsigned instances may be less provable than the signed instances.

Figure 2:
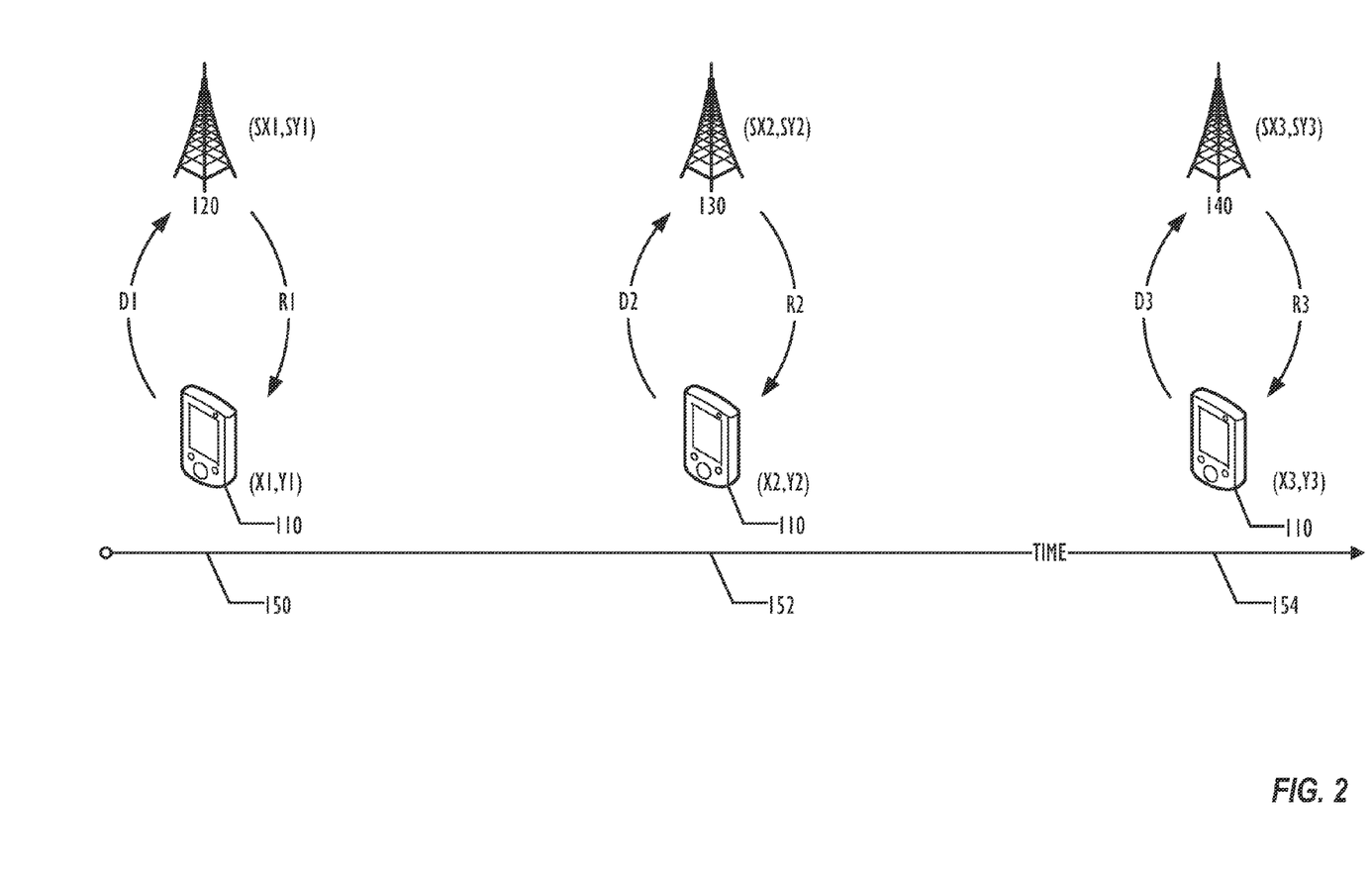
FIG. 2 is a block diagram illustrating a technique for generating a chain of signed geo-location data according to one embodiment.

FIG. 2 is a graph showing a mobile device 110 at three different times 150, 152, and 154, accessing stations 120, 130, and 140. At time 150, mobile device 110 sends data structure $D_1$ to station 120, which responds with signature $R_1$.

When the mobile device 110 moves at time 152 and interacts with station 130, the updated data structure $D_1$ becomes data structure $D_2$, which is passed to station 130. Station 130 signs the data structure, returning signature $R_2$. Similarly, updated data structure $D_2$ becomes data structure $D_3$, incorporating signature $R_2$, which is passed to station 140 at time 154. Station 140 then returns signature $R_3$.

In some embodiments, instead of sending the full data structure $D_i$, the mobile device 110 may send a hash or other functional reduction of the structure $D_i$, although the plaintext data structure $D_i$ may be kept locally for future verification use. Although the data structure $D_i$ is preferably kept on the mobile device 110, some embodiments may allow the mobile device 110 to store the data structure $D_i$ and the signatures $R_i$ remotely, accessing them whenever either the data structure $D_i$ needs to be sent to another station or when geo-location data needs to be verified.

Although FIG. 2 illustrates a situation in which only 1 station is visible to the mobile device 110 at each time, in practice a mobile device 110 may be in contact with multiple stations 120 at any given time. In such a situation, the mobile device 110 may obtain signatures from multiple stations 120, storing the multiple signature data in the signature chain, even if only one station 120 is used for providing communication services to the mobile device 110.

The inclusion of previously signed $R_{i-1}$ into the $D_i$ structure ensures that the entire previous signed chain is signed by the next station. For the first signing interaction, an initial signature $R_0$ in the data structure $D_1$ can be set to zero or any other desired salt value that can be reliably determined to allow validation of the signature chain. In one embodiment, the $R_0$ value may be based on the International Mobile Station Equipment Identity (IMEI) of the mobile device. In some embodiments, the $R_0$ value may be null or empty.

Thus in the example illustrated in FIG. 2, the sequence of actions may be as follows. Although the station geo-location data is illustrated in this example, as indicated above the station-geo-location data is optional and may be omitted.

This example assumes that station 120 is the first station that interacts with mobile device 110, hence instead of a previous signature, the initial signature $R_0$ is provided in the data structure $D_1$. References to $\{x_i, y_i\}$ refer to device location coordinates, and references to $\{sx_i, sy_i\}$ refer to station coordinates.

1. Interaction with station 120

| Signature chain | $R_0$ |
|---|---|
| $D_1$ | (deviceID, $\{x_1, y_1\}$, $R_0$) |
| $R_1$ | Sign(deviceID, $\{x_1, y_1\}$, $\{sx_1, sy_1\}$, $R_0$) |

2. Interaction with station 130:

| Signature chain | $R_0$ |
|---|---|
| $D_2$ | (deviceID, $\{x_2, y_2\}$, $R_1$) |
| $R_2$ | Sign(deviceID, $\{x_2, y_2\}$, $\{sx_2, sy_2\}$, $R_1$) |

3. Interaction with station 140:

| Signature chain | $R_0$ |
|---|---|
| $D_3$ | (deviceID, $\{x_3, y_3\}$, $R_2$) |
| $R_3$ | Sign(deviceID, $\{x_3, y_3\}$, $\{sx_3, sy_3\}$, $R_2$) |

As each signature $R_i$ is received by the mobile station 120, the signature is stored in a collection or chain of signatures for use when verifying addresses. The signature chain may be stored in any desired manner. As can be seen from the above, each signature $R_i$ thus incorporates the current geo-location data as well as all previous geo-location data by the inclusion of the previous signature $R_{i-1}$. For example, signature $R_3$ above incorporates location $\{x_3, y_3\}$ as well as signature $R_2$. By decrypting signature $R_3$, the $\{x_3, y_3\}$ location data can be obtained, as well as signature $R_2$. By further decrypting signature $R_2$, the $\{x_2, y_2\}$ location data can be obtained, etc. In an additional embodiment the station may replace or add its own data about the mobile device location (which may, for example, be based on triangulation or the strength of the signal) into the signature.

Therefore, the chain of signatures $R_i$ grows and contains locations and signatures (which internally may have station IDs and timestamps) from all stations 120 with which the mobile device 110 has interacted. Each subsequent station "stamp" adds to the history and signs the previous signature thus increasing the tamper resistance of the location sequence and creating a verifiable history for the geo-location data.

Figure 3:
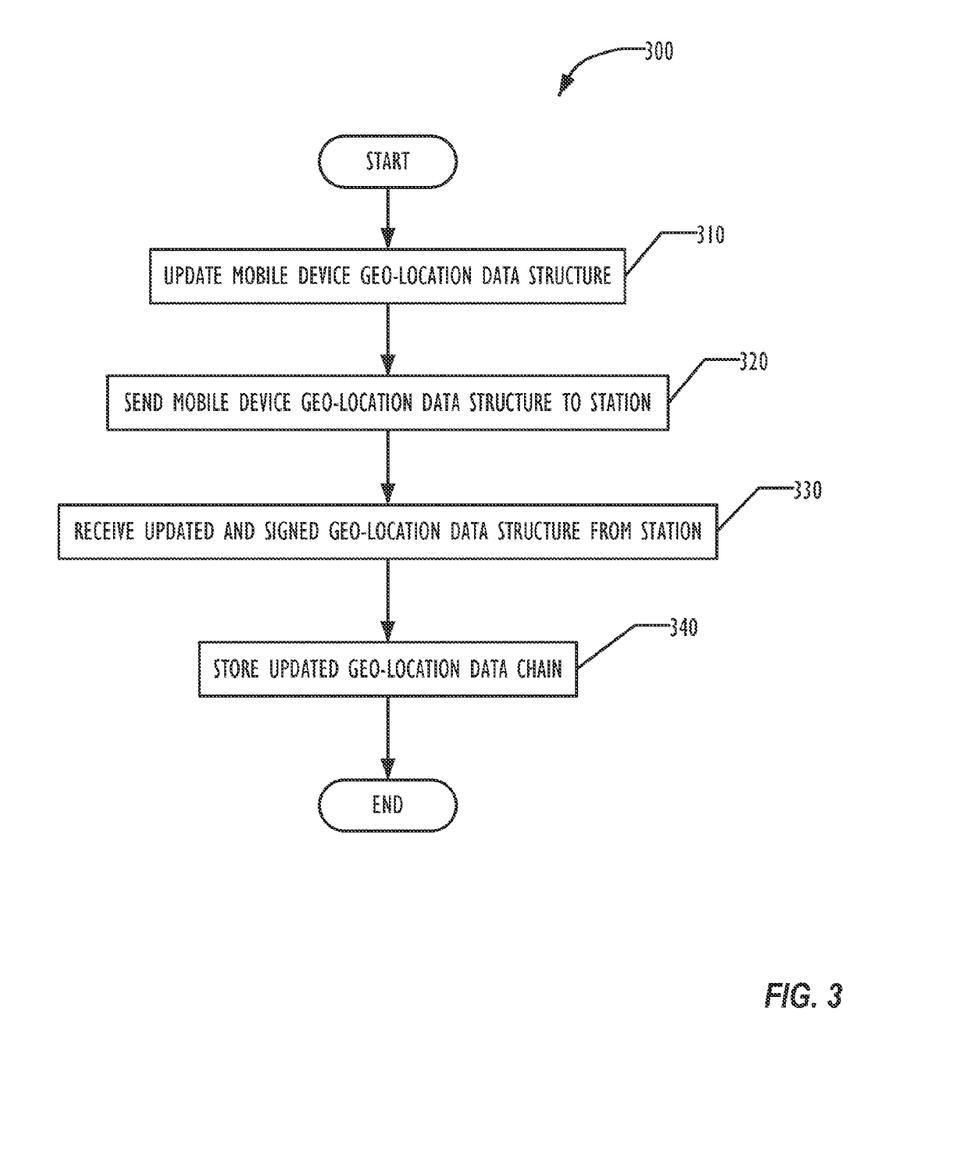
FIG. 3 is a flowchart illustrating a technique for requesting an external provider station to provide an updated signed geo-location data according to one embodiment.

FIG. 3 is a flowchart generally illustrating a technique 300 for obtaining a signed chain of geo-location data according to one embodiment, from the point of view of the mobile device 110. In block 310, the mobile device 110 updates the mobile device data structure with the current device geo-location data for the mobile device 110. In addition, the data structure $D_i$ is updated to include the previous signature element $R_{i-1}$. In some embodiments, the next instance of data structure $D_{i+1}$ may be created with the $R_i$ value at any time after receipt of the $R_i$ signature, including before or after the device geo-location data is updated. In block 320, the mobile device may send the updated data structure $D_i$ to station 120, with a request to sign the data structure $D_i$.

In block 330, the mobile device 110 receives the signature $R_i$.

Finally, in block 340, the mobile device 110 may store the updated device and station geo-location data and the new signature $R_i$ in their respective chains or collections. In some embodiments, the mobile device may store each instance of the data structure $D_i$ as a whole, rather than separately storing the elements of the tuple as separate collections. In one embodiment, the mobile device 110 may then create a new instance of the data structure $D_{i+1}$ that includes signature for use the next time the geo-location data is to be updated; in other embodiments, the mobile device 110 may wait to create the instance $D_{i+1}$ until the next geo-location update event occurs. Mobile device 110 may store the data structures D or R locally or use any available connection to keep a remote copy (e.g. in the "cloud").

Figure 4:
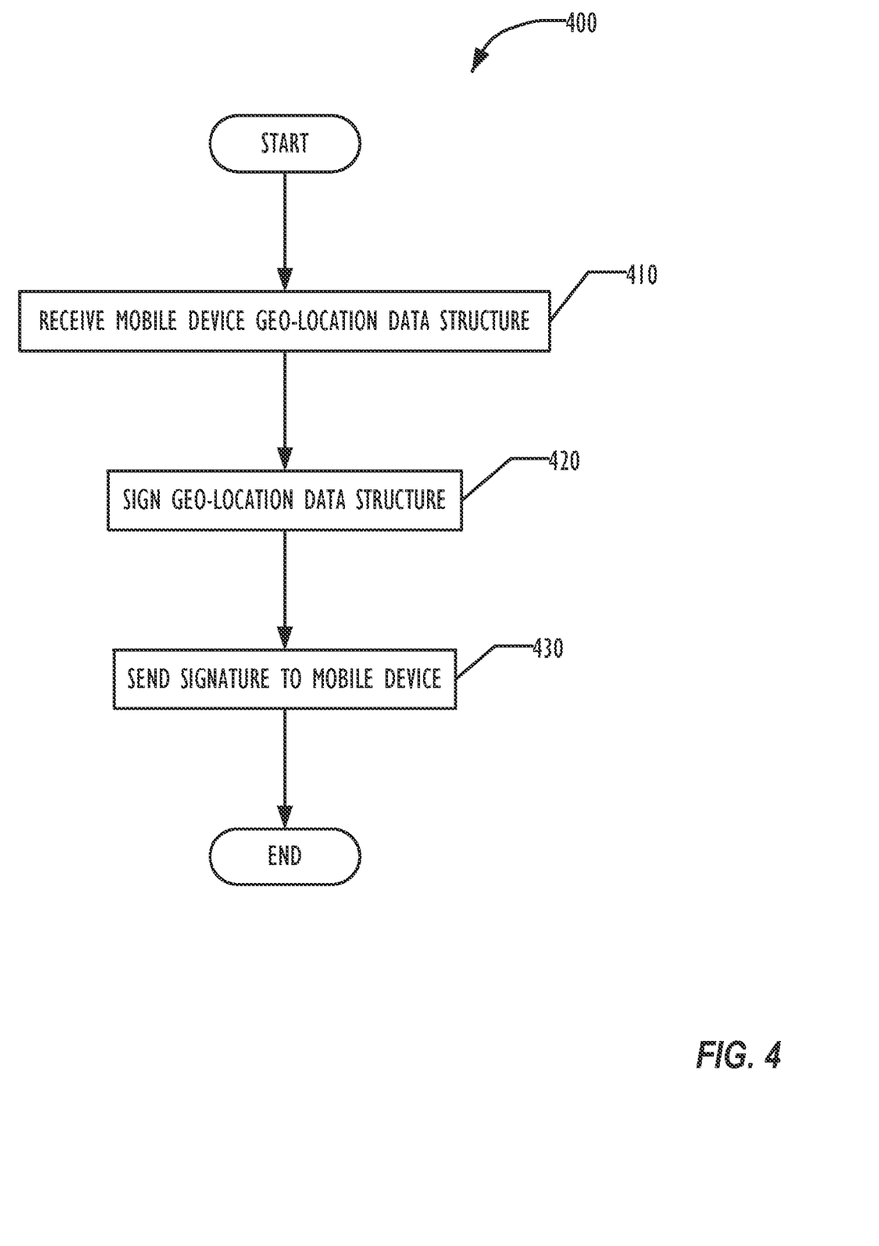
FIG. 4 is a flowchart illustrating a technique for updating a signed chain of geo-location data according to another embodiment.

FIG. 4 is a flowchart illustrating a technique 400 for signing a data structure $D_i$ received from a mobile device 110 by station 120. In block 410, the station 120 receives the data structure $D_i$ from mobile device 110. As indicated above, in some embodiments, the station 120 may receive the full data structure $D_i$, while in other embodiments, the station 120 may receive only a hash of the data structure $D_i$ or $D_i$ may contain a hash of the data structure $R_{i-1}$. In block 420, the station 120 uses any desired cryptographic technique to sign the data structure $D_i$. As indicated above, preferably the signature may include a stationID and a timestamp, the timestamp itself preferably a verifiable timestamp. Then in block 430, the station 120 sends the signature $R_i$ back to the mobile device 110.

Figure 5:
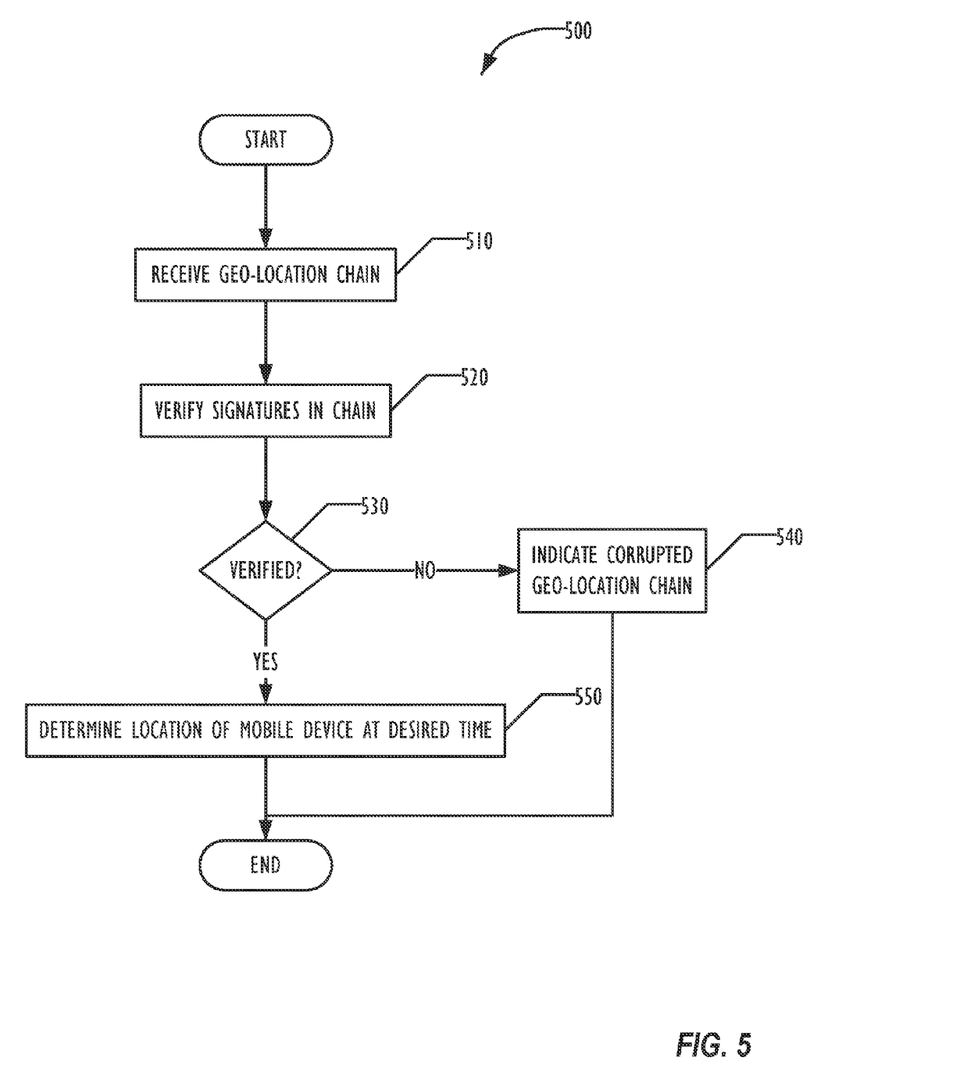
FIG. 5 is a flowchart illustrating a technique for verifying a signed chain of geo-location data according to one embodiment.

When a request for "provable" geo-location is received by the device then the locations chain: $R_1, R_2, \ldots, R_i, R_{i+1}, \ldots$ (or a relevant initial part of it) can be provided by the mobile device 110 for verification. In another embodiment the request may be sent to "a cloud storage" which holds an off-device location history. FIG. 5 is a flowchart illustrating a technique 500 for verifying the geo-location data for the mobile device 110 according to one embodiment.

In block 510 the geo-location chain is received. Verification may be performed in block 520 on the mobile device 110, or may be performed on a remote device that has local or remote access to the geo-location data from the mobile device. An application programming interface (API) may be provided to allow working with the geo-location history. One example of an API call allows retrieval of the full history or a partial history, such as data pertaining to a specific location, a specific timeframe, or a certain number of locations. Other API calls may provide for comparing the deviceLocationHistory data and associated signature timestamps with any $\{x, y, z, t\}$ tuple, thus determining the location of the mobile device at some point in time. In one embodiment, the response from an API may be in a Boolean form (True/False) confirming or denying the device's location at a given time (within some margins of error).

Stations may have different levels of trust, based in some embodiments on a hierarchy of trust beginning with a root certificate authority and one or more certificate authorities in one or more tiers. Depending on the level of trust in the signing stations, the trust level for the device location can be computed at any given time. As an example, a public WiFi access point may serve a function of a station but the level of trust associated with it may be low.

Another API call may request verification of the station's signatures, using standard PKI techniques. Because the data structure $D_i$ is signed using a sequential chain of signatures, verification may serve as a proof of timed location history, and may provide a non-repudiation condition preventing a challenge to the deviceLocationHistory information or the stationLocationHistory information contained in the signed data structures $D_i$.

In one embodiment, the verification may be provided by software running on a remote network server (e.g. a Web server).

The outcome of the verification may be checked in block 530. If successful, then in block 550 the location of the mobile device may be determined at the desired time or within a range of times. If the verification fails, then in block 540 an indication may be provided that the geo-location chain has been corrupted and cannot be trusted.

The disclosed technique provides several advantages. Each station signs all previous signatures, which compounds the trust. For example, while the $D_1$ data structure has only one signature, the $D_2$ data structure incorporates two signatures, and all subsequent $D_i$ lists will be sequentially signed by i subsequent stations. Once the i-th station 120 signs data structure $D_{i-1}$, an attacker would need access to only one certificate to modify data structure $D_i$. But to tamper with some historical $D_j$ (j<i), the attacker would need to obtain multiple (i-j) certificates to forge just that part of the location chain, because tampering with just signature $R_j$, would cause signatures $R_{j+1} \ldots R_i$ to be incorrect. This provides constantly increasing robustness against tampering due to chained signing.

The chain of signed locations $R_i$ will grow and contain locations and signatures (which internally have station_IDs and timestamps) from all stations 120 interacted with prior to the time of signature Each subsequent station "stamp" adds to the history and signs the previous signature thus increasing the tamper resistance of the location sequence and creating a verifiable history for the last location in the chain.

For example, if mobile device 110 receives a request (such as through an API call) to prove the location at time 154, ($\{x_3,y_3\}$), mobile device 110 can return the history $R_3$, $R_2$, $R_1$ which is:

$R_3$=Sign(device_ID,$\{x_3,y_3\}$,$R_2$) which, after expanding $R_2$ is $R_3$=Sign(device_ID,$\{x_3,y_3\}$,Sign(device_ID,$\{x_2,y_2\}$, $R_1$), which after expanding $R_1$ is $R_1$=Sign(device_ID,$\{x_3,y_3\}$), Sign(device_ID,$\{x_2,y_2\}$, Sign(device_ID,$\{x_2,y_2\}$, Sign(device_ID,$\{x_i,y_i\}$, $R_0$)

So the verifier receives the $R_1$, $R_2$, $R_3$ sequence and can verify the entire chain by recursively "un-rolling" the data structures by (assuming a PKI type of signing) applying the public key of each station 120, 130, 140 in turn.

In one embodiment, instead of sending the data structures $D_i$ to the stations 120 for signing, the mobile device 110 may generate a hash of the data structure $R_{i-1}$ and send only the hash of it to the stations to minimize the risk of privacy leaks or violations by the stations. In such an embodiment, verification would involve checking the validity of the signatures producing the hash value that was signed, and comparing the hash value to the result of hashing the data structure $D_{i-1}$. Assuming a one-way hash function was used, a comparison of the two hash values would suffice to verify the signature and the data in data structure $D_i$.

In addition, the geo-spatial consistency of the location chain can be verified. Assuming realistic use of the mobile devices (e.g., a GPS system attached to a car would be expected to travel with speeds less than the maximum for a car) the location chain can be examined for consistency with the kind of the device and its typical use. A malicious or incorrectly operating station or the device itself may be able to add incorrect location to the chain, but anomalous location entries can be ignored and certificates of "lying" stations excluded or revoked.

To check the geo-spatial consistency of a signature chain and the underlying geo-location data, the verifier can verify distances, timestamps, and compare travel speeds between points $A\{x_1,y_1\}$ and $B \{x_2,y_2\}$ with the expected transportation modality (walking, boat, bike, car, train, plane, etc.) and/or maximum speed of the modality (passenger plane, fighter jet). Increased device travel speeds may correlate with the mobile device 110 approaching a transportation hub such as an airport or a high-speed train station, which would normally be recorded in the history. So some heuristics may be applied in consistency checking via estimating the maximum travel speed based on the proximity to transport facilities that provide means of rapid transportation.

In one use case, when a traveler goes abroad, if the traveler's bank has access to the location history of the mobile device 110, the bank can allow transactions as the bank would know with high certainty that the traveler had moved to an airport, landed in a specific country and a series of mobile telephone towers would pinpoint the traveler's location near a particular ATM or merchant. The mobile device 110 can submit this history, for example via a banking app that would be configured to have access to the "provable geo-location" API.

In another use case, when a driver's car has built-in geo-location functionality and the driver wants to prove that a speeding ticket belongs to a car with a cloned license plate, the driver could use the provable location history to argue for cancellation of the ticket. Similarly, a search warrant could be obtained to allow police to obtain the provable location history from a suspect's mobile device 110, which could be used as non-repudiable evidence of the location of the mobile device 110 at a particular time of interest.

One potential attack scenario on suggested system is to organize a covert external channel from one device to another. If the first device can proxy all geo-location requests to the second then the locations chain will reflect the second device instead of the first device. Such a "Man in the Middle" attack on our system can be precluded in one embodiment by binding of the device_ID to a specific device, which can be achieved by signing of the data structures $D_i$ in a trusted execution environment, such as a Trusted Platform Module, an Apple Secure Enclave, an Intel® Software Guard Extensions (SGX), an ARM TrustZone®, a SecureElement, etc., and proper provisioning of keys used for such signing. The secret (e.g. the key or the device_ID) may be sealed inside said trusted execution environment and thus not available for the "Man in the Middle".

Figure 6:
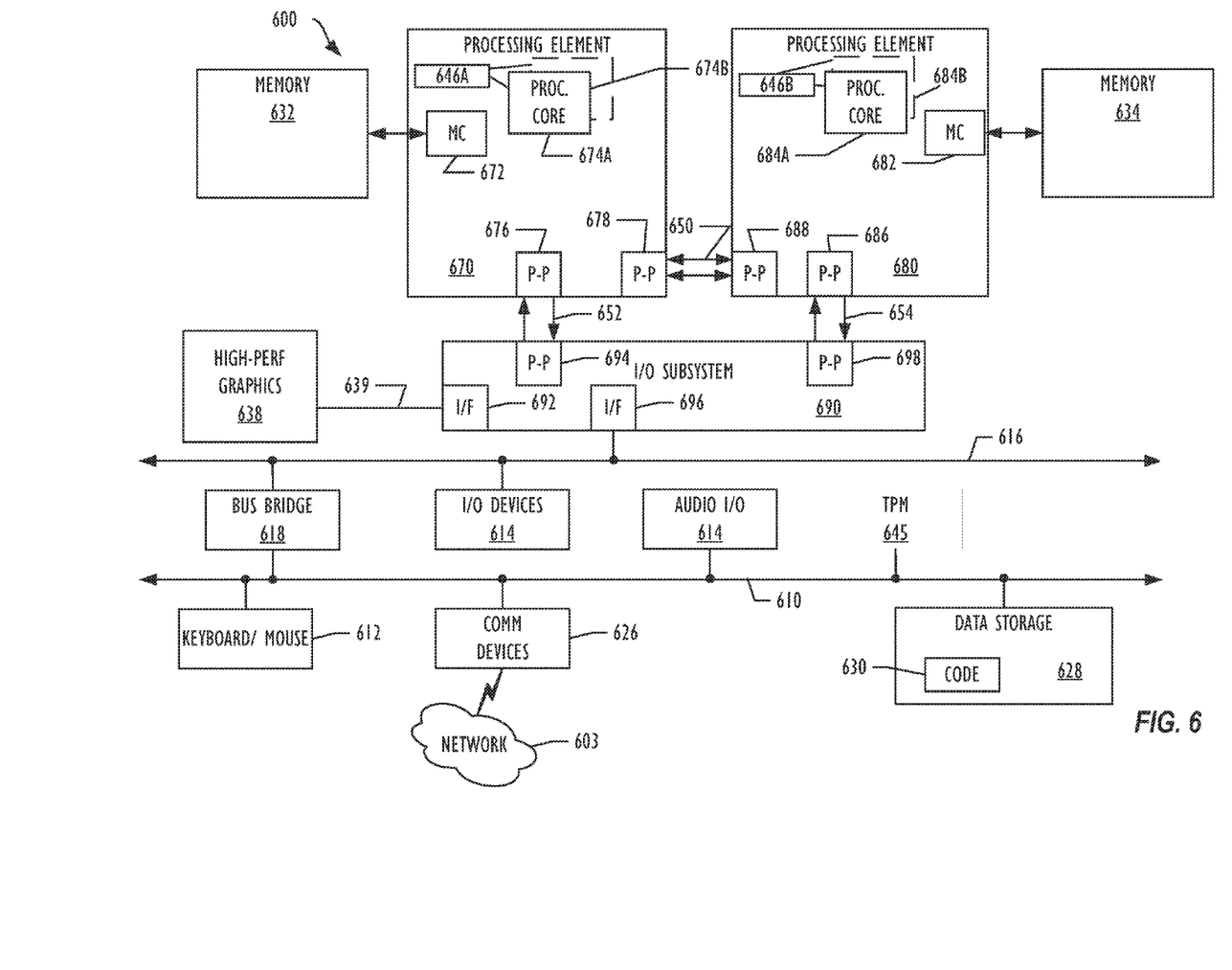
FIG. 6 is a block diagram illustrating a programmable device for use with techniques described herein according to one embodiment.

Referring now to FIG. 6, a block diagram illustrates a programmable device 600 that may employ the geo-location techniques described above in accordance with one embodiment. The programmable device illustrated in FIG. 6 is a multiprocessor programmable device 600 that includes a first processing element 670 and a second processing element 680. While two processing elements 670 and 680 are shown, an embodiment of programmable device 600 may also include only one such processing element.

Programmable device 600 is illustrated as a point-to-point interconnect system, in which the first processing element 670 and second processing element 680 are coupled via a point-to-point interconnect 650. Any or all of the interconnects illustrated in FIG. 6 may be implemented as multi-drop bus rather than point-to-point interconnects.

As illustrated in FIG. 6, each of processing elements 670 and 680 may be multicore processors, including first and second processor cores (i.e., processor cores 674a and 674b and processor cores 684a and 684b). Such cores 674a, 674b, 684a, 684b may be configured to execute instruction code to implement the techniques described above. However, other embodiments may use processing elements that are single core processors as desired. In embodiments with multiple processing elements 670, 680, each processing element may be implemented with different numbers of cores as desired.

Each processing element 670, 680 may include at least one shared cache 646. The shared cache 646a, 646b may store data (e.g., instructions) that are utilized by one or more components of the processing element, such as the cores 674a, 674b and 684a, 684b, respectively. For example, the shared cache may locally cache data stored in a memory 632, 634 for faster access by components of the processing elements 670, 680. In one or more embodiments, the shared cache 646a, 646b may include one or more mid-level caches, such as level 2 (L2), level 3 (L3), level 4 (L4), or other levels of cache, a last level cache (LLC), or combinations thereof.

While FIG. 6 illustrates a programmable device with two processing elements 670, 680 for clarity of the drawing, the scope of the present invention is not so limited and any number of processing elements may be present. Alternatively, one or more of processing elements 670, 680 may be an element other than a processor, such as an graphics processing unit (GPU), a digital signal processing (DSP) unit, a field programmable gate array, or any other programmable processing element. Processing element 680 may be heterogeneous or asymmetric to processing element 670. There can be a variety of differences between the processing elements 670, 680 in terms of a spectrum of metrics of merit including architectural, microarchitectural, thermal, power consumption characteristics, and the like. These differences may effectively manifest themselves as asymmetry and heterogeneity amongst the processing elements 670, 680. In some embodiments, the various processing elements 670, 680 may reside in the same die package.

First processing element 670 may further include memory controller logic (MC) 672 and point-to-point (P-P) interconnects 676 and 678. Similarly, second processing element 680 may include a MC 682 and P-P interconnects 686 and 688. As illustrated in FIG. 6, MCs 672 and 682 couple the processing elements 670, 680 to respective memories, namely a memory 632 and a memory 634, which may be portions of main memory locally attached to the respective processors. While MC logic 672 and 682 is illustrated as integrated into the processing elements 670, 680, in some embodiments the MC logic may be discrete logic outside the processing elements 670, 680 rather than integrated therein.

Processing element 670 and processing element 680 may be coupled to an I/O subsystem 690 via P-P interconnects 676, 686 and 684, respectively. As illustrated in FIG. 6, I/O subsystem 690 includes P-P interconnects 694 and 698. Furthermore, I/O subsystem 690 includes an interface 692 to couple I/O subsystem 690 with a high performance graphics engine 638. In one embodiment, bus 649 may be used to couple graphics engine 638 to I/O subsystem 690. Alternately, a point-to-point interconnect 639 may couple these components.

In turn, I/O subsystem 690 may be coupled to a first link 616 via an interface 696. In one embodiment, first link 616 may be a Peripheral Component Interconnect (PCI) bus, or a bus such as a PCI Express bus or another I/O interconnect bus, although the scope of the present invention is not so limited.

As illustrated in FIG. 6, various I/O devices 614 may be coupled to first link 616, along with a bridge 618 which may couple first link 616 to a second link 610. In one embodiment, second link 610 may be a low pin count (LPC) bus. Various devices may be coupled to second link 610 including, for example, a keyboard/mouse 612, communication device(s) 626 (which may in turn be in communication with the computer network 603), and a data storage unit 628 such as a disk drive or other mass storage device which may include code 630, in one embodiment. The code 630 may include instructions for performing embodiments of one or more of the techniques described above. Further, an audio I/O 624 may be coupled to second link 610. In addition, a Trusted Platform Module 645 may be connected to second link 610 to provide a secure cryptographic environment for the programmable device 600.

Note that other embodiments are contemplated. For example, instead of the point-to-point architecture of FIG. 6, a system may implement a multi-drop bus or another such communication topology. Although links 616 and 610 are illustrated as busses in FIG. 6, any desired type of link can be used. Also, the elements of FIG. 6 may alternatively be partitioned using more or fewer integrated chips than illustrated in FIG. 6.

Figure 7:
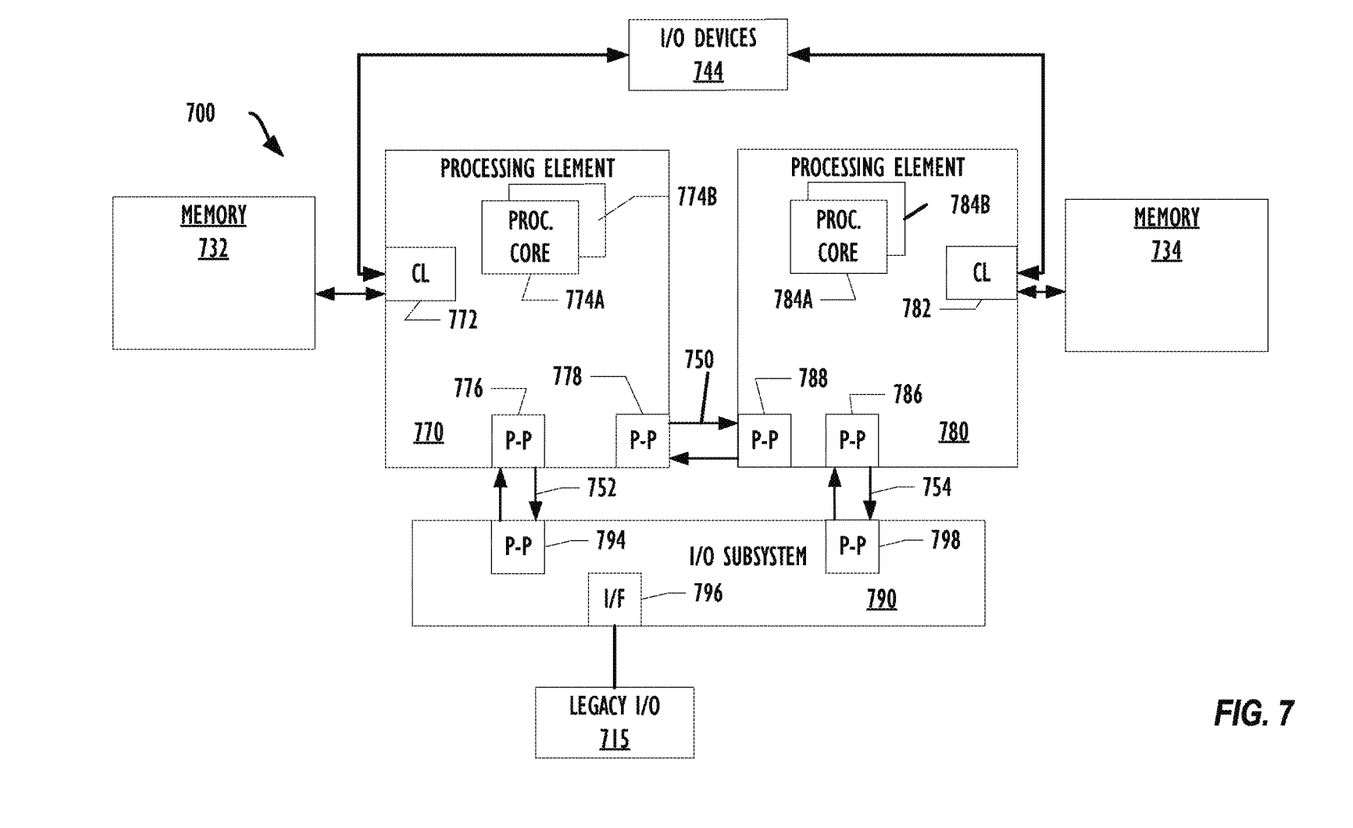
FIG. 7 is a block diagram illustrating a programmable device for use with techniques described herein according to another embodiment.

Referring now to FIG. 7, a block diagram illustrates a programmable device 700 according to another embodiment. Certain aspects of FIG. 6 have been omitted from FIG. 7 in order to avoid obscuring other aspects of FIG. 7.

FIG. 7 illustrates that processing elements 770, 780 may include integrated memory and I/O control logic ("CL") 772 and 782, respectively. In some embodiments, the CL 772, 782 may include memory control logic (MC) such as that described above in connection with FIG. 6. In addition, CL 772, 782 may also include I/O control logic. FIG. 7 illustrates that not only may the memories 732, 734 be coupled to the CL 772, 782, but also that I/O devices 714 may also be coupled to the control logic 772, 782. Legacy I/O devices 715 may be coupled to the I/O subsystem 790.

The programmable devices depicted in FIGS. 6 and 7 are schematic illustrations of embodiments of programmable devices which may be utilized to implement various embodiments discussed herein. It will be appreciated that various components of the programmable devices depicted in FIGS. 6 and 7 may be combined in a system-on-a-chip (SoC) architecture.

Where a programmable device such as those depicted in FIGS. 6 and 7 are used to implement a mobile device 110 or a station 120, the programmable device may include or be connected to a transmitter and receiver for wireless communication with the mobile device 110 or station 120, and, in the case of a station 120, a tower or other structure for mounting antennae for communicating with mobile devices 110. Such transmitters, receivers, and towers are well known in the art and no further description herein is necessary for the person of skill in the art.

Program instructions may be used to cause a general-purpose or special-purpose processing system, such as the ones illustrated in FIGS. 6 and 7, that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that when executed cause a processing system or other electronic device to perform the methods. The term "machine readable medium" used herein shall include any medium that is capable of storing or encoding a sequence of instructions for execution by the machine and that cause the machine to perform any one of the methods described herein. Furthermore, the "machine-readable medium" may be implemented as one or multiple physical objects. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

The following examples pertain to further embodiments.

Example 1 is a machine-readable medium on which are stored instructions, comprising instructions that when executed cause a programmable device to: obtain geo-location data corresponding to a location of the programmable device; send the geo-location data and a first signature data to a geo-location station; receive a second signature data, the second signature data corresponding to the geo-location data and the first signature data, from the geo-location station; and store the second signature data.

Example 2 includes the subject matter of example of example 1, wherein the instructions that when executed cause the programmable device to send the geo-location data comprise instructions that when executed cause the programmable device to send a collection of geo-location data corresponding to the programmable device and the first signature data to the geo-location station.

Example 3 includes the subject matter of any of examples 1-2, wherein the instructions that when executed cause the programmable device to send the geo-location data further comprise instructions that when executed cause the programmable device to send an identification data corresponding to the programmable device to the geo-location station.

Example 4 includes the subject matter of any of examples 1-3, wherein the first signature data is a predetermined value indicating that the geo-location data comprises an initial geo-location data.

Example 5 includes the subject matter of any of examples 1-4, wherein the instructions further comprise instructions that when executed cause the programmable device to transmit the geo-location data, the first signature data, and the second signature data for verification of the geo-location data.

Example 6 includes the subject matter of any of examples 1-5, wherein the second signature data is signed by the geo-location station using a cryptographic key of the geo-location station.

Example 7 includes the subject matter of any of examples 1-6, wherein the instructions that when executed cause the programmable device to store the second signature data comprise instructions that when executed cause the programmable device to store the second signature data in a collection of signature data that includes the first signature data.

Example 8 includes the subject matter of example any of examples 1-7, wherein the instructions that when executed cause the programmable device to obtain geo-location data corresponding to the location of the programmable device comprise instructions that when executed cause the programmable device to request the geo-location data from the geo-location station.

Example 9 includes the subject matter of example any of examples 1-8, wherein the instructions that when executed cause the programmable device to send the geo-location data and the first signature data to geo-location station comprise instructions that when executed cause the programmable device to: calculate a hash value corresponding to the geo-location data and the first signature data; and send the hash value to the geo-location station.

Example 10 is a geo-location data provider station, comprising: a processing element; memory, coupled to the processing element, on which are stored instructions that when executed cause the processing element to: receive data from a mobile device comprising a mobile device identifier, a geo-location data corresponding to the mobile device, and a first signature; calculate a second signature of the mobile device identifier, the geo-location data, and the first signature; and transmit the second signature to the mobile device.

Example 11 includes the subject matter of example 10, wherein the instructions further comprise instructions that when executed cause the processing element to: calculate a geo-location data corresponding to the mobile device; and send the geo-location data to the mobile device.

Example 12 includes the subject matter of any of examples 10-11, wherein the instructions that when executed cause the processing element to calculate the second signature comprise instructions that when executed cause processing element to use a private cryptographic key to calculate the second signature, the private cryptographic key corresponding to a public cryptographic key.

Example 13 includes the subject matter of any of examples 10-12, wherein the data received from the mobile device comprises a hash, the hash generated from the mobile device identifier, the geo-location data corresponding to the mobile device, and the first signature.

Example 14 is a method, comprising: receiving a request to verify a first geo-location data corresponding to a mobile device; receiving a first signature corresponding to the first geo-location data; verifying the first signature, extracting a signed geo-location data and a second signature from the first signature, the second signature corresponding to a second geo-location data corresponding to the mobile device; and comparing the signed geo-location data with the first geo-location data.

Example 15 includes the subject matter of example 14, further comprising repeating the verifying and comparing until the second signature comprises a predetermined initial signature.

Example 16 includes the subject matter of any of examples 14-15, further comprising providing an indication that the signed geo-location data does not match the first geo-location data.

Example 17 includes the subject matter of any of examples 14-16, wherein the method is performed by the mobile device.

Example 18 includes the subject matter of any of examples 14-17, wherein the method is performed by a remote server having access to the first geo-location data and the first signature.

Example 19 includes the subject matter of any of examples 14-18, wherein the signed geo-location data comprises an identifier corresponding to the mobile device.

Example 20 includes the subject matter of any of examples 14-19, wherein the signed geo-location data comprises a geo-location data of the mobile device and a geo-location data of a geo-location provider station.

Example 21 is a mobile device, comprising: means for sending geo-location data and a first signature data to a geo-location station; means for receiving a second signature data from the geo-location station, the second signature data comprising a signature of the geo-location data and the first signature data; and means for storing the second signature data.

Example 22 includes the subject matter of example 21, further comprising: means for transmitting the geo-location data, the first signature data, and the second signature data for verification of the geo-location data.

Example 23 includes the subject matter of any of examples 21-22, further comprising: means for calculating a hash value corresponding to the geo-location data and the first signature data and sending the hash value to the geo-location station.

Example 24 is a mobile device, comprising: a processing element; and a memory coupled to the processing element, on which are stored instructions that when executed cause a processing element to: obtain geo-location data corresponding to a location of the mobile device; send the geo-location data and a first signature data to a geo-location station; receive a second signature data, the second signature data corresponding to the geo-location data and the first signature data, from the geo-location station; and store the second signature data.

Example 25 includes the subject matter of example 24, wherein the instructions that when executed cause the processing element to send the geo-location data comprise instructions that when executed cause the processing element to send a collection of geo-location data corresponding to the processing element and the first signature data to the geo-location station.

Example 26 includes the subject matter of any of examples 24-25, wherein the instructions that when executed cause the processing element to send the geo-location data further comprise instructions that when executed cause the processing element to send an identification data corresponding to the processing element to the geo-location station.

Example 27 includes the subject matter of any of examples 24-26, wherein the first signature data is a predetermined value indicating that the geo-location data comprises an initial geo-location data.

Example 28 includes the subject matter of any of examples 24-27, wherein the instructions further comprise instructions that when executed cause the processing element to transmit the geo-location data, the first signature data, and the second signature data for verification of the geo-location data.

Example 29 includes the subject matter of any of examples 24-28, wherein the second signature data is signed by the geo-location station using a cryptographic key of the geo-location station.

Example 30 includes the subject matter of any of examples 24-29, wherein the instructions that when executed cause the processing element to store the second signature data comprise instructions that when executed cause the processing element to store the second signature data in a collection of signature data that includes the first signature data.

Example 31 includes the subject matter of any of examples 24-30, wherein the instructions that when executed cause the processing element to obtain geo-location data corresponding to the location of the processing element comprise instructions that when executed cause the processing element to request the geo-location data from the geo-location station.

Example 32 includes the subject matter of any of examples 24-31, wherein the instructions that when executed cause the processing element to send the geo-location data and the first signature data to geo-location station comprise instructions that when executed cause the processing element to: calculate a hash value corresponding to the geo-location data and the first signature data; and send the hash value to the geo-location station.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. At least one non-transitory machine-readable medium comprising instructions, that, when executed cause a programmable device to:
   obtain geo-location data corresponding to a location of the programmable device;
   send the geo-location data and a first cryptographic signature to a geo-location data provider station, the first cryptographic signature including a chain of previous cryptographic signatures, respective ones of the chain of previous cryptographic signatures corresponding to previous locations of the programmable device;
   receive from the geo-location data provider station a second cryptographic signature, the second cryptographic signature including a cryptographic signature of (a) the geo-location data obtained from the programmable device, (b) geo-location data corresponding to a current location of the geo-location provider station and (c) the first cryptographic signature; and
   store the second cryptographic signature by adding the second cryptographic signature data to the chain of previous cryptographic signatures, the geo-location data including timestamped two-dimensional or three-dimensional coordinates in a geo-location coordinate system.

2. The non-transitory machine-readable medium of claim 1, wherein the instructions, when executed, cause the programmable device to send identification data corresponding to the programmable device to the geo-location data provider station.

3. The non-transitory machine-readable medium of claim 1, wherein the instructions, when executed, cause the first cryptographic signature to include a value indicating that a signing interaction is an initial signing interaction for the programmable device.

4. The non-transitory machine-readable medium of claim 1, wherein the instructions, when executed, cause the programmable device to transmit the geo-location data, the first cryptographic signature, and the second cryptographic signature for verification of the geo-location data.

5. The non-transitory machine-readable medium of claim 1, wherein the instructions, when executed, cause the second cryptographic signature to be signed by the geo-location data provider station using a cryptographic key of the geo-location data provider station.

6. The non-transitory machine-readable medium of claim 1, wherein the instructions, when executed, cause the programmable device to store the second cryptographic signature in a collection of cryptographic signature data that includes the first cryptographic signature.

7. The non-transitory machine-readable medium of claim 1, wherein the instructions, when executed, cause the programmable device to request the geo-location data from the geo-location data provider station.

8. The non-transitory machine-readable medium of claim 1, wherein the instructions, when executed, cause the programmable device to:
   calculate a hash value corresponding to the geo-location data and the first cryptographic signature; and
   send the hash value to the geo-location data provider station.

9. A geo-location data provider station, comprising:
   at least one processor; and
   memory in communication with the at least one processor, the memory including instructions that, when executed, cause the at least one processor to:
   obtain data from a mobile device including a mobile device identifier, geo-location data corresponding to the mobile device, and a first cryptographic signature, the first cryptographic signature including a chain of previous cryptographic signatures, respective ones of the chain of previous cryptographic signatures corresponding to previous locations of the programmable device;
   calculate a second cryptographic signature, the second cryptographic signature including a cryptographic signature of (a) the geo-location data obtained from the mobile device, (b) geo-location data corresponding to a current location of the geo-location data provider station and (c) the first cryptographic signature; and
   transmit the second cryptographic signature to the mobile device, the geo-location data obtained from the mobile device and the geo-location data corresponding to the current location of the geo-location data provider station including at least one of timestamped two-dimensional coordinates or three-dimensional coordinates in a geo-location coordinate system.

10. The geo-location data provider station of claim 9, wherein the at least one processor is to calculate the second cryptographic signature with a private cryptographic key, the private cryptographic key corresponding to a public cryptographic key of the geo-location data provider station.

11. The geo-location data provider station of claim 9, wherein the data obtained from the mobile device includes a hash generated from (a) the mobile device identifier, (b) the geo-location data corresponding to the mobile device, and (c) the first cryptographic signature.

12. A method of providing provable geo-location data, comprising:
    receiving, by executing an instruction with at least one processor, first data from a mobile device, the first data including a mobile device identifier, first geo-location data corresponding to the mobile device, and a first cryptographic signature, the first cryptographic signature including a chain of previous cryptographic signatures, respective ones of the chain of previous cryptographic signatures corresponding to previous locations of the programmable device;
    calculating, by executing an instruction with the at least one processor, a second cryptographic signature, the second cryptographic signature including a cryptographic signature of (a) the first geo-location data, (b)

geo-location data corresponding to a current location of a provider station, and (c) the first cryptographic signature; and transmitting the second cryptographic signature to the mobile device, the first geo-location data and the geo-location data corresponding to the current location of the provider station including at least one of time-stamped two-dimensional coordinates or three-dimensional coordinates in a geo-location coordinate system.

13. The method of claim 12, further including using a private cryptographic key to calculate the second cryptographic signature, the private cryptographic key corresponding to a public cryptographic key of the geo-location data provider station.

14. The method of claim 12, wherein the first data received from the mobile device includes a hash generated from the mobile device identifier, the first geo-location data, and the first cryptographic signature.

\* \* \* \* \*